United States Patent
Riegl et al.

(10) Patent No.: US 6,879,384 B2
(45) Date of Patent: Apr. 12, 2005

(54) PROCESS AND APPARATUS FOR MEASURING AN OBJECT SPACE

(75) Inventors: Johannes Riegl, Trabenreith (AT); Rainer Reichert, Horn (AT); Nikolaus Studnicka, Vienna (AT); Andreas Ullrich, Gablitz (AT)

(73) Assignee: Riegl Laser Measurement Systems, GmbH, Horn (AT)

( * ) Notice: Subject to any disclaimer, the term of this patent is extended or adjusted under 35 U.S.C. 154(b) by 0 days.

(21) Appl. No.: 10/322,521

(22) Filed: Dec. 19, 2002

(65) Prior Publication Data

US 2003/0123045 A1 Jul. 3, 2003

(30) Foreign Application Priority Data

Dec. 19, 2001 (AU) ........................................ A1986/2001

(51) Int. Cl.[7] ........................... G01C 3/08; G01B 11/26; G01B 11/24; G06K 9/00
(52) U.S. Cl. ................... 356/5.01; 356/612; 356/141.1; 382/154
(58) Field of Search .............................. 356/141.1, 612, 356/5.01–5.15; 382/154

(56) References Cited

U.S. PATENT DOCUMENTS

| | | | | |
|---|---|---|---|---|
| 4,950,075 A | * | 8/1990 | Ichinose et al. | |
| 5,361,217 A | * | 11/1994 | Makimura et al. | |
| 5,988,862 A | * | 11/1999 | Kacyra et al. | |
| 6,563,574 B1 | * | 5/2003 | Ohtomo et al. | .......... 356/141.1 |

* cited by examiner

*Primary Examiner*—Bernarr E. Gregory
*Assistant Examiner*—Brian Andrea
(74) *Attorney, Agent, or Firm*—Burns, Doane, Swecker & Mathis, L.L.P.

(57) ABSTRACT

A process and an apparatus for measuring an object space using an opto-electronic range finder which operates according to a method of determining the time-of-flight of a signal comprise a first measuring step including transmitting optical transmitter signals in form of a beam of a predetermined first divergence angle, receiving optical signals reflected from an object and evaluating a distance value, while scanning the object space. After or before this first take-up step follows a second one wherein reference marks in the object space are taken up with a using an enlarged divergence angle so as to detect reliably the reference marks. The apparatus comprises, accordingly, appropriate devices for varying the divergence angle.

67 Claims, 4 Drawing Sheets

PROCESS AND APPARATUS FOR MEASURING AN OBJECT SPACE

BACKGROUND OF THE INVENTION

1. Field of the Invention

The present invention relates to a process and an apparatus for taking up, or measuring, an object space using an opto-electronic range finder which operates according to a method of determining the time-of-flight of a signal. In the context of the present specification, the term "determining the time-of-flight" should be understood in its broadest meaning, i.e. encompassing both counting the time between the emission of a transmitter signal up to the receipt of a reflected signal and, in the case of a continuous-wave laser, determining the time-of flight by determining the phase shift between the transmitted beam and the reflected beam received.

More specifically the present invention relates to such a process which comprises a first take-up step in which optical transmitter signals in form of a beam of a predetermined first divergence angle are transmitted along a first path of rays into the object space, and after reflection of such an optical signal from an object it is received by a receiver, i.e. after a time-of flight of said transmitter signals and said reflected signals which, thus, have a certain time relationship during a measuring cycle between a transmitted and a reflected signal.

While appropriate optics are assigned to the transmitter and the receiver and define a first and second optical axis, an evaluating step determines the distance of the above mentioned object in the object space from the time-of-flight meant in the above sense. To obtain different distance values even from larger objects, a scanning step by deviating the direction of the first and second optical axes by a certain angle of deflection between two subsequent measuring cycles. Since the scanning step is effected over a certain maximum deviation angle of a scanner, it is contemplated to decode this angle in any position of the scanner for determining the actual angle of deviation during scanning.

When an object space has to be taken up, reference marks, e.g. retro-reflectors, are arranged in the object space which have either defined geographical coordinates, thus being adapted to define a coordinate system (as soon as their position in relation to the "image" taken up is known) into which the image can be inserted in correspondence with reality, or to form a 3-D image of the object space by taking the object space from at least two different directions, and using said coordinates to form a 3-D image, e.g. by known CAD-computer software. The term "image" in the context of range finding means that all the measuring results during scanning result in a so-called point cloud which is often called "distance image". However, it already been suggested to superimpose such a "distance image" by a two-dimensional image of the object scene, and in this case all ingredients necessary to form a 3-D image are present, i.e. a two-dimensional image plus the depth of the scene derived from the distance measurings which form the third dimension.

The invention relates also to an apparatus for carrying out the above described process.

2. Background Information

Since retro-reflectors, generally used as reference marks, have typically a size of about 25 mm×25 mm up to 100 mm×100 mm and modem range finders, at a beam divergence smaller than 1 mrad, e.g. 0.3 mrad, have a radius of action significantly larger than 1000 m, one cannot ensure that the range finder detects all reference marks. This may result in problems, particularly in the case of a measuring program which runs, to a high degree, automatically, and may result in the necessity to repeat measurements. Since the evaluation, particularly combining of a plurality of detail images and the assigned data files to obtain a 3-D model is, in general, made off-line and not in the field, this may lead to a considerable expenditure.

SUMMARY OF THE INVENTION

It is an object of the invention to ensure, in the case of the above-mentioned range finder systems, that reference marks are detected reliably.

In principle, one could chose the ratio of beam divergence and scanning rate so that the measuring spots of two subsequent measurement overlap each other to such a degree that even a reference mark, that is positioned far away, is reliably detected. But this would mean a very high number of measuring values and, thus, very long measuring times for the whole object space. So long a measuring time is, however, often not acceptable; first, if it is the question of non-stationary objects, second, if during taking up other events have to be interrupted, as it may be the case when documenting a traffic accident or in applications in industry. Thus, the above mentioned object should be achieved even with short measuring times.

According to the invention, these objects are achieved in that a second take-up step is carried out, using an enlarged divergence angle of the transmitted beam for determining the location of the reference marks in the form of coordinates for use as a reference in each first take-up step. Of course, the second take-up step comprises all the sub-steps that are comprised by the first take-up step.

This second take-up step could theoretically be carried out simultaneously with the first take-up step. However, this would necessitate two appliances, one of which does the first step, the other one the second step. Therefore, it is preferred if the steps are carried out in succession, particularly the second step before the first step. For if the second step is carried out after the first step, the determined location (coordinates) of the reference marks can only be inserted into the image taken in the first step in a separate procedure.

To change the divergence angle various devices may be used. For example, optical elements could be inserted in the path of rays of the transmitter during the first step, which make the divergence smaller; in the second step they are removed or change their focal length and/or the focus which means, in general, moving at least one lens along the optical axis. However, it is preferred to use optical elements which enlarge the divergence angle during the second step.

The optical elements can be assembled of more than one piece. In principle, they could consist of wedges, mirrors and so on. Preferred is to use at least one lens. For example a plurality of lenses could be used to form a zoom lens where at least one lens is movable to change the focal length and/or the focus.

There are alternative ways of using optical elements for varying the divergence angle. Either an optical element may be inserted into the path of rays of the transmitter and/or into the path of rays of the receiver.

Changing the divergence angle does not mean changing it insignificantly. A factor of at least 5 should be taken into consideration. However, it is preferred to have at least a factor of 10. On the other hand, choosing a factor too high would in most cases be impracticable. Therefore, a factor of 20 in maximum is contemplated.

According to another characteristic of the invention, the focus of the respective optical element is changed to adjust the divergence of angle either of the transmitter (which is preferred) and/or of the receiver.

It is particularly advantageous, if after the second take-up step has been carried out, details of the object space are taken up according to the first step where a reference mark has been determined, wherein scanning is effected with such an elevated resolution, as compared with said second step, that said angle of deflection between two subsequent measuring cycles is equal to or smaller than said first divergence angle so that said coordinates of the respective reference mark can be determined with high precision from said details taken-up.

Optionally, the distance value of a reference mark determined in the second step is used for focusing the optics onto this reference mark.

If at least two distance measurements are made using the enlarged divergence, the resulting distance values may advantageously be averaged.

Especially if retro-reflectors are used as reference marks in the object space, the amplitude of the echo-signal received can be so high that the receiver channel may be overexcited. This may lead to false results. To avoid this, a step of reducing the power of either the transmitter signals and/or of the received signals while determining the location of the reference marks to limit the dynamics of at least one of the signals received after reflection.

Preferably, this may be done by inserting an optical damping element, having a damping effect to optical signals, into the path of rays of the respective signal. As an example of such a damping element, a gray filter may be used.

The damping effect of the damping element may be continuously variable, e.g. by the use of a continuously variable aperture diaphragm or a gray wedge. The operation may be such, that after a first measurement the damping element is varied so that the receiver channel can be operated in its optimum dynamic range.

Alternatively, the damping effect of the damping element may be variable in steps. In this case, the damping element may be an apertured diaphragm having at least two apertures of different size, the smaller one being inserted in one of said path of rays during the second take-up step, the wider one being inserted in one of said path of rays during the first take-up step. In this case too, the damping element may be varied so that the receiver channel can be operated in its optimum dynamic range.

Especially if retro-reflectors are used as reference marks in the object space, at least one second receiver channel which is collinear and has a reduced sensitivity as compared with the first receiver channel may be used, wherein in the second take-up step the distance of a retro-reflector is measured by the second receiver channel. In such a case, it is suitable if all these receiver channels are evaluated simultaneously by using a multi-channel time measuring device. In this way, a single take-up step in which the whole object space is scanned, the entire dynamic range is determined with the highest possible precision.

BRIEF DESCRIPTION OF THE DRAWINGS

Further details of the invention will become apparent from the following description of a preferred embodiment with reference to the drawing in which.

DETAILED DESCRIPTION OF THE DRAWINGS

Figure 1:
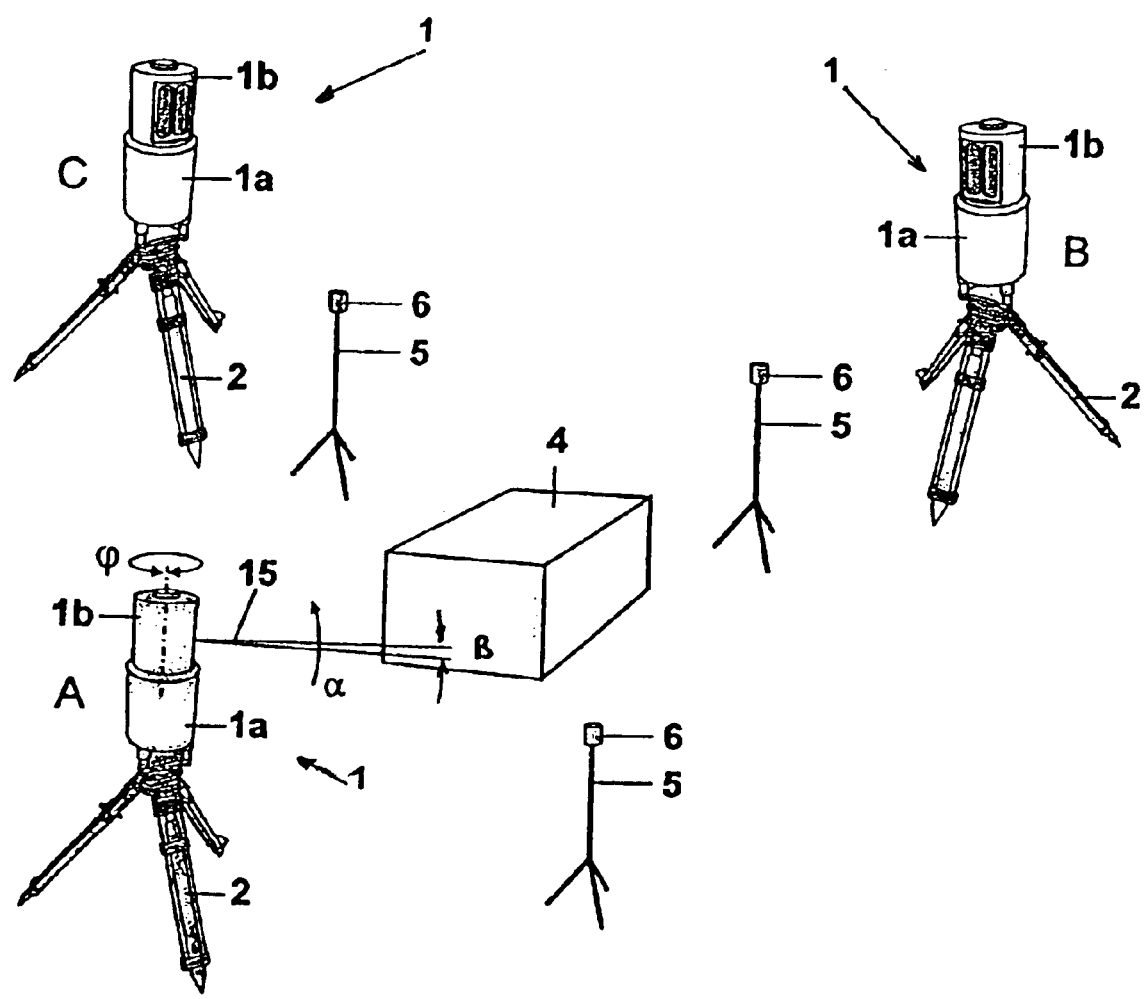
FIG. 1 shows an arrangement for measuring an object in an object space.

FIG. 1 shows an arrangement for taking up an object 4 schematically indicated, in order to obtain a 3-D model. A laser scanner 1 together with its tripod is first placed in a first position A and is oriented towards an object 4. Around this object 4, a series of reference marks, preferably formed by retro-reflectors 6, are positioned, each being mounted on a tripod 5. Although retro-reflectors are preferred, because they will reliably be caught by the sight of the scanner 1, other reference marks may be used, such as tablets with a marking sign. Instead of the use of laser signals, other optical signals may also be employed, such as bundled beams of light of any wave length desired.

The laser scanner or measuring head 1, in this embodiment, has two parts, i.e. a first, stationary lower part 1$a$ firmly attached to the tripod 2, and a rotatable or pivotable upper part 1$b$. This means that the upper part 1$b$ is rotatably mounted about a vertical axis (as is indicated in position A) on the lower part 1$a$ of the measuring head 1, and is driven to exert a movement to and fro according to arrows $\phi$ by a motor (not shown). The upper part 1$b$ of the measuring head 1 comprises a laser range finder system, at least part of an evaluating device and a rotating mirror prism (or other scanning device) which will be described below with reference to FIG. 4 and which deflects a measuring beam 15 of a certain divergence angle $\beta$ about a horizontal axis up and down in correspondence with arrow $\alpha$.

Thus, by the laser scanner 1, due to its pivoting movement over the angle $\phi$ and the rotation of the prism (8 in FIG. 4) to scan the object space over the angle $\alpha$, the whole object space which includes the object 4 and the retro-reflectors 6, serving as reference marks, are taken as an image, and a corresponding data file is stored in a memory of a computer, as will be explained later with reference to FIG. 5.

After a first pick-up from the position A, the laser scanner 1 is transferred to position B, while the retro-reflectors 6 remain positioned as before. It will be understood that the invention is not restricted to re-position one laser scanner and to pick the object space up in succession, but it would equally be possible to use more than one laser scanners to be operated simultaneously.

In position B, the laser scanner 1 is again oriented towards the object 4, and a further pick-up is taken. In order to obtain a documentation of all aspects as precise as possible of the object 4, the laser scanner 1 may be then positioned in one or more different places (e.g. in position C). In any case, the data files obtained from the different places are then combined to form a 3-D model with customary software (such as CAD-software), in which step the reference marks 6 of each image picked up are rendered coincident.

As mentioned before, various reference marks are conceivable. For instance they may contain a coding mark to be automatically identified for later processing by a processor so that the processor may bring the same mark seen from different positions easily in registration or coincidence. Otherwise, an operator may be necessary to do this. As soon as the spatial coordinates of the reference marks 6 are defined, in any coordinate system desired, the object 4 may be included and positioned into this coordinate system by the processor. The 3-D model of the object 4 may then be represented from any side desired and may even be processed further using known CAD programs.

Figure 2:
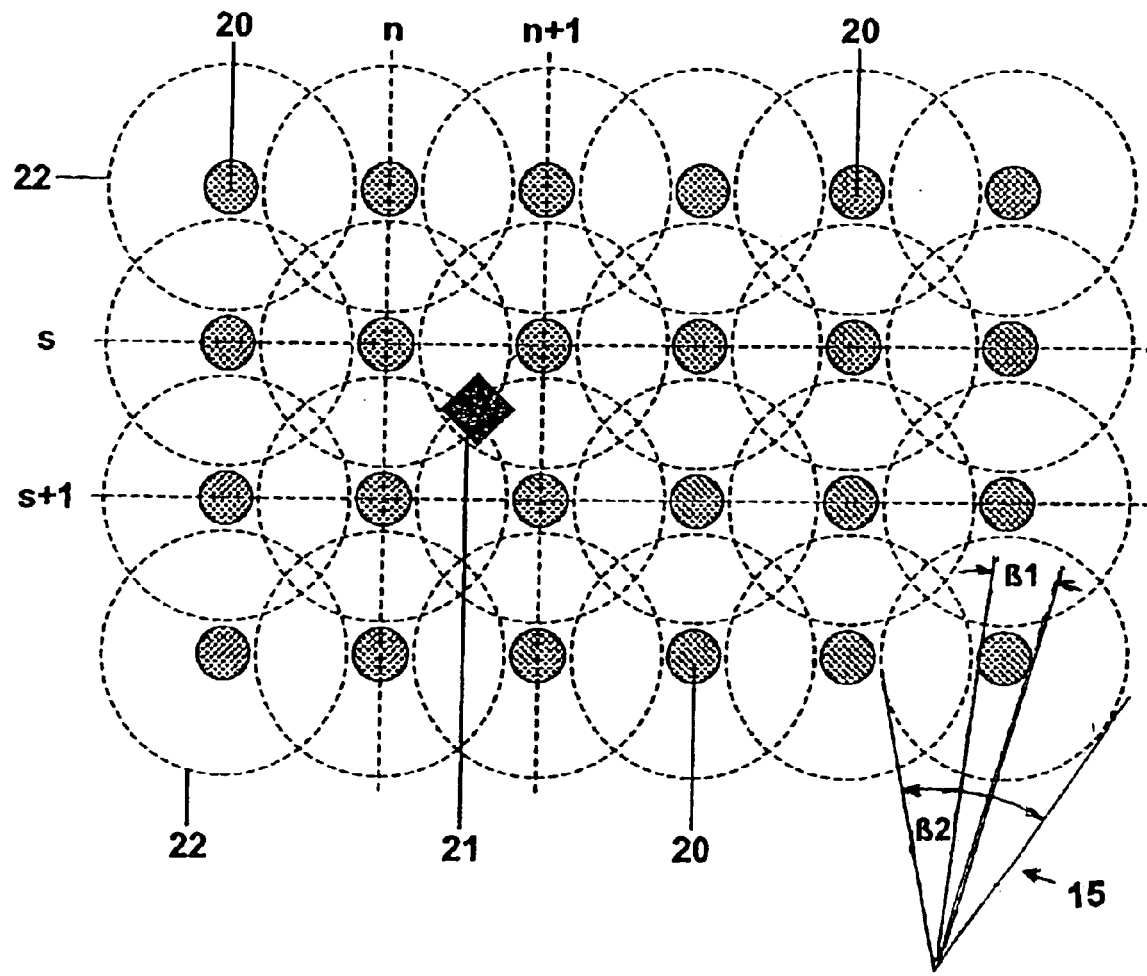
FIGS. 2 and 3 illustrates schematically the cross-section scanning beams in different steps or operational modes.
Figure 3:
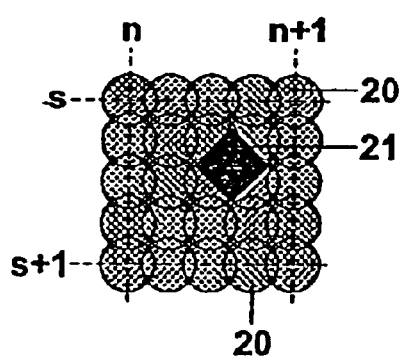

In FIGS. 2 and 3 a small detail part of the scanning pattern of the laser scanner 1 (FIG. 1) is shown. The distribution of the measuring values (each corresponding to a circle in the scanning pattern) must not necessarily be exactly regular, but can be chosen. The object space according to FIG. 1 is scanned by the beam 15 of the laser scanner 1 and may have a divergence angle β of about 0.3 mrad. In FIGS. 2 and 3 the measuring spots of this beam 15 are designated 20. As the individual spots 20 are spaced from each other, it is clear that the scanner pivots the measuring beam 15 by a deviating angle between two measurements at spots 20 (i.e. the scanning angle α and φ in the time interval between two measurements) which is greater than the divergence angle β and corresponds, fro example, to about 1 mrad. Choosing this scanning rate is a compromise between resolution and total measuring time and, of course, may be selected at will or according to necessities.

Principally, it would be desirable to chose the scanning rate (or the deviating angle α and/or φ between two measurements) so small that the measuring spots 20 overlap each other. On the other hand, such small scanning rates would lead to extremely long measuring times, which are often not acceptable, particularly if it is the question of large scanning areas (large object spaces to be picked up) or of not purely stationary objects. A ratio of scanning rate and beam divergence, as in FIG. 2, does not, however, appear a problem of resolution of a normal object. This means that it would be easily be possible to restrict oneself to develop a 3-D image of object 4 (FIG. 1) by measuring only spots 20 which are slightly spaced from each other, because the respective processor could extrapolate the distances in the spaces between two spots. However, as far it is the task to fit the (distance) image taken into a coordinate system using reference marks, difficulties may arise.

In general, retro-reflectors 6 are used as reference marks and have, typically, dimensions of about 50 mm×50 mm up to 100 mm×100 mm. With a radius of action of a modern laser scanner which is at about 1 km or significantly longer, the reference marks would appear under an angle so small that the probability that the measuring beam does not detect the reflectors is very high. In the case of FIG. 2 such a possibility is shown: a reflector 21 is situated in a field between two respective spots 20 at vertical coordinates (in direction of angle α) n and n+1 and horizontal coordinates (in direction of angle φ) s and s+1. Therefore, it will not be recognized by the apparatus.

According to the invention, to avoid this the laser scanner 1 is switched over to a second measuring mode, wherein the divergence angle β (FIG. 1), which according to FIG. 2 initially had been β1, is increased approximately by a factor of 5 to become a widened divergence angle of β2. The corresponding measuring spots are designated 22. This widening of the beam 15 can be done by appropriate optics in at least one of the path of rays of the laser scanner 1, as will explained below with reference to FIG. 4. In short, either at least one optical element is provided which is displaced in and out of the respective path of rays, or an optical element is provided moveable for zooming and/or for focusing.

By widening the beam, the energy impinging an area of an object (4 or 6) is reduced per unit of area so that the energy reflected from many objects will not be sufficient for evaluation. The retro-reflectors, however, will have a degree of reflection so high that even with positioning these reference marks at a large distance the reflected signal will have an amplitude totally sufficient for a reliable measurement. To the contrary, as will be explained later, often additional measures will be necessary to avoid overexciting the receiver device by too large amplitudes of the signals reflected from the retro-reflectors.

Since the individual measuring spots 22 of the above described second measuring mode, using a large divergence angle β (FIG. 1) of the scanning and measuring beam 15, overlap each other, the reference marks 6 will reliably be recognized. This mode is exclusively used to identify the reference marks 6 positioned in the object space, while all other objects, such as object 4, will supply reflected signals of significantly lower power, and will therefore, be not recognized and, thus, suppressed. However, it is clear that the accuracy of determination of the positions of the reference marks, due to the large area of the spots 22, will not be too high.

Since, on the other hand, the precision, with which a 3-D model can be embedded or inserted into a superordinate system of coordinates, is determined primarily by the precise location or definition of the positions of the reference marks, it is possible, according to a further characteristic of the invention, only those partial and detailed areas of the object field are scanned at a low scanning rate, and thus with a high spatial resolution, in which a reference mark has been determined during the second scanning or take-up step. FIG. 3 illustrates this for the reference mark 21 (see also FIG. 2) detected in the area of coordinates (n, n+1; s, s+1). In this third step or mode the original beam divergence angle β is adjusted, but to scan at a low scanning rate only the area between n and n+1, while the areas in-between the reference marks are scanned at a high velocity. The scanning rate or the angular step size of deviation is chosen in such a manner that the measuring spots 20 overlap each other (compare FIGS. 2 and 3). In this mode, the positions of the reference marks can be detected with high precision. These positions, necessary to establish a coordinate system, will be used when the results of the first measuring step are evaluated.

Details of the principle of the invention will now be explained with reference to FIG. 4. This figure shows the measuring head 1 of FIG. 1 at a larger scale. On the stationary lower part 1*a* of measuring head 1, firmly attached to the tripod 2, is the head's upper part 1*b* pivotable about a vertical axis 23. The measuring head's upper part 1*b* is driven by a motor 18. An angle decoder 19 also situated on vertical axis 23 detects the angular movement of the measuring head's upper part 1*b* and informs an evaluation stage 3 about the actual pivoting angle φ. The measuring head's upper part 1*b* comprises the laser range finder and a mirror prism 8 as a part of the scanning device which rotatable about a horizontal axis 24. As has already been mentioned, other scanning devices may be used, such as tilting mirrors or electronic scanners. The mirror prism 8 has only three surfaces, but may comprise more, as for example four, and is driven by a motor 11 on the shaft of which another angle decoder is arranged to determine the angle α of vertical deviation of the beam 15. This driving motor 11 for the mirror prism 8 is controlled by the evaluation stage 3 which also processes the angle signals containing the information on the angle α received from the angle decoder 12.

The evaluation stage 3 comprises also the circuitry for determining a distance value either from the counted time-of-flight or a time and phase relationship between transmitted and received signals. Therefore, the stage 3 is also coupled to the transmitting laser 9 and controls it. The laser 9 may consist of a laser diode, such as a GaAs-diode, of a solid laser or a gas laser, but consists advantageously of a diode pumped, grade switched solid laser.

An optic 10 is located in the path of rays of the transmitting laser 9 and will, in general, be adjusted so that it forms an image of the light source, i.e. the laser 9, in infinity. By the rotating mirror prism 8, the measuring beam 15 is deviated or deflected in the direction of arrow α which designates also the angle of deviation. A receiver channel is provided in parallel to the transmitter channel 9, 10 and comprises an optical system 13 and a receiver diode 14. The optical axis of this receiver channel 13, 14 is deflected by the mirror prism 8 in parallel to the measuring beam 15. However, it will be understood that the transmitter channel 9, 10 and the receiver channel 13, 14 may each have a separate prism with a separate drive motor, where these motors have to be synchronized.

Between the laser 9 and the optical system 10, there are two sliding carriers 25 and 26 each displaceable in a horizontal plane. The first sliding carrier 25 supports at least one, in the present embodiment two, lens systems 27 by which the measuring beam 15 is widened (i.e. the divergence angle β of FIG. 1 is enlarged), on the one hand, while the measuring field of the receiver channel 13, 14 is enlarged correspondingly, on the other hand, i.e. the measuring spot 20 of the first measuring step is enlarged to form the spot 22 (FIG. 2). Although this embodiment is preferred, it would alternatively be possible that the smaller spot 20 is formed by a reducing lens system 27 in the first measuring step, and is widened by withdrawing the lens system 27 out of the path of rays of the measuring beam 15. Another alternative could be to have a zooming lens system 27 permanently in the path of rays of the measuring beam 15 and to widen the divergence angle β by either by zooming, i.e. displacing at least one zoom lens along the axis of the beam 15, or by changing the focus, as will be appreciated by those skilled in the art.

A second sliding carrier 26 supports at least one light damping element 28 which either reduces the effective power of the transmitting laser 9 and/or the amplitude of the received signal. In the present embodiment both possibilities are realized by having a damping element 28 in both channels 9, 10 and 13, 14. These damping elements may be chosen from a vast variety of damping elements known by those skilled in the art. A preferred embodiment uses a gray filter which is either a uniformly damping filter or a portion of a displaceable gray wedge which may be appropriately be adjusted by means known per se. Another possibility within the scope of the present invention is the use of a diaphragm which may either be a continuously adjustable aperture diaphragm (i.e. situated in an aperture plane) and/or an apertured diaphragm which is adjustable in steps by moving either of at least two apertures of different size into the respective path of rays. Both sliding carriers 25, 26 may be displaced either manually or by driving devices (not shown) to be moved into the respective path of rays or out of it. If a driving device is used, it is suitable that the evaluation stage 3 controls this driving device, such as a motor or an electromagnet.

Figure 4:
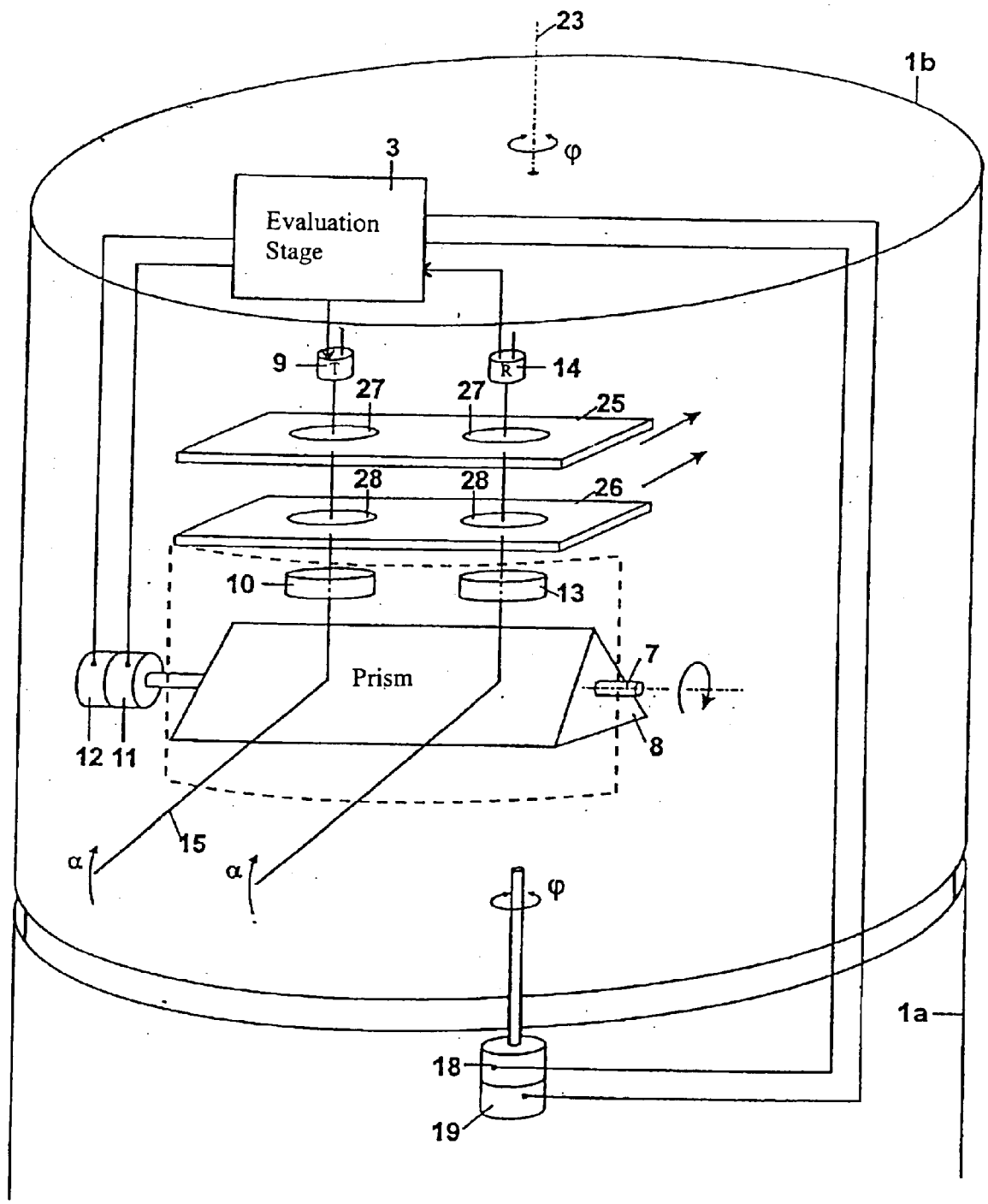
FIG. 4 shows schematically a measuring head of the apparatus for carrying out the process according to the invention.
Figure 5:
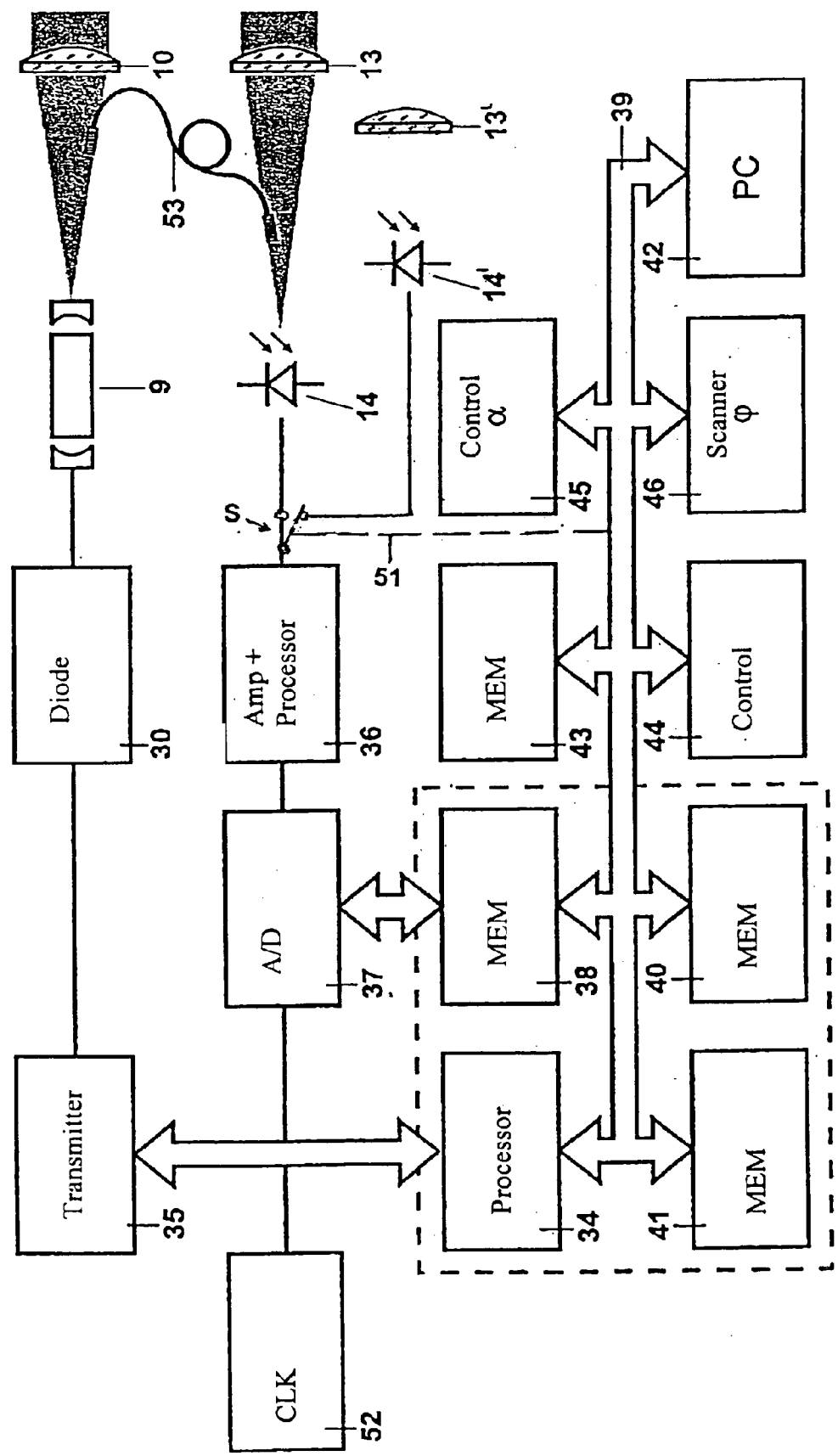
FIG. 5 is a block diagram of the apparatus.

FIG. 5 shows, in form of a block diagram, schematically the design of the evaluation and control stage 3 of the laser scanner according to the invention, the diagram illustrating only the systems postponed to the scanning units shown by way of example in FIG. 4. According to FIG. 5 a laser transmitter 35 is operated with a passively grade switched solid laser 9 pumped by diodes 30. In contrast to known laser range finders which operate with laser diodes, the solid laser 9 cannot be synchronized by a processor 34, but is free-running. Therefore, it is necessary to supply to the receiver 14 not only the echo pulses or reflected signals, but also the transmitted pulses. This can advantageously be done by means of a photoconductor 53 inserted into the path of rays of the solid laser 9. The laser light branched off from the transmitter path of rays is supplied to the receiver 14 directly through the photoconductor 53. A particularly preferred approach is, however, to have an additional receiver, separated from receiver 14 for receiving the echo-pulses, which, after obtaining the transmitter pulse (be it transferred to it via a photoconductor or by a beam splitter in the path of rays of the transmitting channel 9, 10), provides an electrical pulse for starting the measurement of the time-of-flight.

Adjacent to the transmitter optics 10, a receiver optical system 13 is provided whose optical axis is parallel to that of the transmitter optics 10. The receiver optical system 13 concentrates radiation, generally diffusely, reflected from a target or object situated in the path of rays of the transmitter optics onto the receiver diode 14. Advantageously, an avalanche diode is used as a receiver diode 14. Preferably the spectral characteristics of the transmitting laser 9 and the receiving diode 14 are made compatible to each other so that the receiver diode 14 has its maximum spectral sensitivity in a range where the transmitting laser 9 emits maximum power. Since, however, the receiver diode 14, apart from the radiation transmitted by the laser 9 and reflected by an object (such as object 4 in FIG. 1), will receive much noise radiation in the form of daylight or light of various artificial light sources possible present in an object space, it may be advantageous to pre-pose an optical filter, which has narrow-band characteristics as good as possible, which provide a maximum transmission within a spectral band in which the wave length of the laser 9 has its maximum.

The receiver channel 13, 14 is capable of aiming to a plurality of targets and is controlled by a clock-generator 52 and comprises an amplifier and analogue signal processor stage 36 as well as an analogue/digital converter 37, where the transmitter pulse and the echo pulse(s) are digitized and further processed. Considering the constant time-of-flight of the reference transmitter pulse in the photoconductor 53, the time difference or interval between the arrival of the transmitter pulse through the photoconductor, and the echo pulse, and from this interval the distance of the respective object is determined. Although this method is preferred, it is within the scope of the present invention to determine the time-of-flight indirectly by comparing the phase-shift between transmitter signal and received signal of a continuous-wave signal.

The whole circuitry is clocked by a clock-generator 52. The processor 34 and the data memory 38 are coupled to each other by a data bus 39 schematically illustrated. Coupled to this data bus are also a program memory 40 for the processor 34 as well as an intermediate data memory 41 in which rough data are stores after the processor 34 has carried out a first evaluation, and which is read out at the end of a measuring cycle. Processor 34, using algorithms stored in program memory 40, determines from these rough data a distance value for each individual image element.

In addition to the receiver channel 13, 14 described, at least one further, collinear receiver channel 13', 14' of a reduced sensitivity may be provided and may be switched to become active by a switch S. When measuring the distances of the retro-reflectors 6 (FIG. 1) in the above described second measuring step using a larger divergence angle β, this (or these) less sensitive receiver channel(s) 13', 14' may be used.

Controlling the driving motor 11 of the mirror prism 8 is done by a unit 45, while the motor 18 for pivoting the upper part 1b of the measuring head is controlled by a unit 46. The processor 34 controls the program sequences of all three measuring modes described above and, therefore, controls also the switch S (which will normally be an electronic switch), as is indicated by a dotted line 51 connecting the switch S with the data bus 39. The necessary enlargement of the beam's divergence angle β (FIG. 1) and damping of signal is released by unit 44 which controls the drive of the sliding carriers 25 and 26 and their optical system and damping elements, such as gray filters. The variation of the scanning rate necessary particularly for the third mode of operation is released by the processor 34 which controls the scanning unit 46 (for pivoting the upper part 1b of the measuring head) correspondingly, suitably also the unit 45 to adjust the speed of motor 11 for rotating the prism 8.

The data files obtained from different scanning take-ups and which are taken up each by mode 1 and mode 3 plus per raster element (20 or 22 in FIG. 2) contain a set of data consisting of the angle coordinates α and φ, a distance value and, optionally, further data, such as signal amplitude, signal width and signal shape etc. are stored in a memory 43.

Further processing of a plurality of scanned images for generating a 3-D model of the object space, as has been described with reference to FIG. 1, is effected in a processor 42. This processing is, in general, done off-line. In doing this, the data files (point clouds) obtained in the individual scanned images are combined in the processor 42, bringing the reference marks into coincidence. The result is a 3-D model which is available as a data file and may be further processed with customary construction, design, geodesy, architecture or similar computer programs.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A process for measuring an object space using an opto-electronic range finder which operates according to a method of determining a time-of-flight of a signal, said process comprising:
   a first measuring step for:
   transmitting optical transmitter signals as a beam of a predetermined first divergence angle along a first path of rays into said object space;
   receiving optical signals reflected from an object situated in said object space by receiver means after a time-of flight of said transmitter signals, said reflected signals having a time relationship during a measuring cycle between a transmitted and a reflected signal;
   providing first optical means within said first path of rays of said optical transmitter signals, said optical means defining a first optical axis, and second optical means arranged before said receiver means and defining a second optical axis in a second path of rays;
   scanning said object space by deviating a direction of said first and second optical axes by an angle of deflection between two subsequent measuring cycles, said angle being adjustable;
   decoding said angle for determining an actual angle of deviation during scanning;
   evaluating and determining a distance value from at least one of said time-of-flight and said time relationship;
   arranging reference marks in said object space; and
   carrying out a second measuring step using an enlarged divergence angle of said transmitted beam for determining a location of said reference marks as coordinates for use as a reference in each first measuring step.

2. Process as claimed in claim 1, wherein said optical transmitter signals are signals of a laser.

3. Process as claimed in claim 1, wherein said step of scanning by deviating the direction comprises deviating in two directions substantially orthogonal to each other.

4. Process as claimed in claim 1, wherein in said step of scanning, a deviation of the angle per measuring cycle is larger than said divergence angle in said first measuring step.

5. A process for measuring an object space using an opto-electronic range finder which operates according to a method of determining time-of-flight of a signal, said process comprising:
   a first measuring step for transmitting optical transmitter signals of a certain power of transmitter as a beam of a predetermined first divergence angle along a first path of rays into said object space;
   receiving optical signals reflected from an object situated in said object space by receiver means in a first receiver channel after a time-of flight of said transmitter signals, said reflected signals having a time relationship during a measuring cycle between a transmitted and a reflected signal;
   providing first optical means within said first path of rays of said optical transmitter signals, said optical means defining a first optical axis, and second optical means arranged before said receiver means and defining a second optical axis in a second path of rays;
   scanning said object space by deviating a direction of said first and second optical axes by an angle of deflection between two subsequent measuring cycles, said angle being adjustable;
   decoding said angle for determining an actual angle of deviation during scanning;
   evaluating and determining a distance value from at least one of said time-of-flight and said time relationship;
   arranging retro-reflectors as reference marks in said object space; and
   carrying out a second measuring step using an enlarged divergence angle of said transmitted beam for determining a location of said reference marks as coordinates for use as a reference in each first measuring step.

6. Process as claimed in claim 5, comprising:
   reducing the power of at least one of said transmitter signals and said signals of said receiving step while determining the location of said reference marks to limit dynamics of said signals received after reflection.

7. Process as claimed in claim 6, wherein said power of the transmitter is reduced.

8. Process as claimed in claim 6, wherein said reducing step is carried out by inserting an optical damping element, having a damping effect to optical signals, into at least one of the first and second paths of rays.

9. Process as claimed in claim 8, wherein said damping element comprises:
   gray filter means.

10. Process as claimed in claim 9, wherein said gray filter means comprises:
    a gray wedge having at least two positions of different damping effect, said gray wedge being displaced from one position to another between said first and second measuring steps.

11. Process as claimed in claim 8, wherein said damping element comprises:

at least one adjustable aperture diaphragm.

12. Process as claimed in claim 11, wherein said diaphragm is an apertured diaphragm having at least two apertures of different size, a smaller aperture being inserted in one of said paths of rays during said second measuring step, and a wider aperture being inserted in one of said paths of rays during said first measuring step.

13. Process as claimed in claim 8, wherein the damping effect of said damping element is continuously variable.

14. Process as claimed in claim 8, wherein the damping effect of said damping element is variable in steps.

15. Process as claimed in claim 5, comprising:

providing at least one second receiver channel which is collinear and has a reduced sensitivity as compared with said first receiver channel, wherein in said second measuring, a distance of a retro-reflector is measured by said second receiver channel.

16. Process as claimed in claim 1, comprising:

forming a 3-D image of said object space by taking said object space from at least two different directions, and using said coordinates to form said 3-D image.

17. A process for measuring an object space using an opto-electronic range finder which operates according to a method of determining a time-of-flight of a signal, said process comprising:

a first measuring step for transmitting optical transmitter signals as a beam of a predetermined first divergence angle along a first path of rays into said object space;

receiving optical signals reflected from an object situated in said object space by receiver means after a time-of flight of said transmitter signals, said reflected signals having a certain time relationship during a measuring cycle between a transmitted and a reflected signal;

providing first optical means within said first path of rays of said optical transmitter signals, said optical means defining a first optical axis, and second optical means arranged before said receiver means and defining a second optical axis in a second path of rays;

scanning said object space by deviating a direction of said first and second optical axes by an angle of deflection between two subsequent measuring cycles, said angle being adjustable;

decoding said angle for determining an actual angle of deviation during scanning;

evaluating and determining a distance value from at least one of said time-of-flight and said time relationship;

arranging reference marks in said object space; and carrying out a second measuring step using an enlarged divergence angle of said transmitted beam for determining a location of said reference marks as coordinates for use as a reference in each first measuring step, wherein said second measuring step is carried out before said first measuring step.

18. Process as claimed in claim 17, wherein after said second measuring step has been carried out, details of the object space are measured according to the first step in which a reference mark has been determined, wherein scanning is effected with such an elevated resolution, as compared with said second step, that said angle of deflection between two subsequent measuring cycles is equal to or smaller than said first divergence angle so that said coordinates of the reference mark can be determined from said details measured.

19. Process as claimed in claim 17, comprising:

using the distance value of a reference mark determined in said second step for focusing said first optical means onto at least one of said reference marks.

20. Process as claimed in claim 17, wherein at least two distance measurements are made using said enlarged divergence, resulting distance values being averaged.

21. Process as claimed in claim 1, wherein said second measuring step is carried out after said first measuring step.

22. A process for measuring an object space using an opto-electronic range finder which operates according to a method of determining a time-of-flight of a signal, said process comprising:

a first measuring step for transmitting optical transmitter signals as a beam of a predetermined first divergence angle along a first path of rays into said object space;

receiving optical signals reflected from an object situated in said object space by receiver means after a time-of flight of said transmitter signals, said reflected signals having a certain time relationship during a measuring cycle between a transmitted and a reflected signal;

providing first optical means within said first path of rays of said optical transmitter signals, said optical means comprising at least one optical element and defining a first optical axis, and second optical means comprising at least one optical element arranged before said receiver means for defining a second optical axis in a second path of rays;

scanning said object space by deviating a direction of said first and second optical axes by an angle of deflection between two subsequent measuring cycles, said angle being adjustable;

decoding said angle for determining an actual angle of deviation during scanning;

evaluating and determining a distance value from at least one of said time-of-flight and said time relationship;

arranging reference marks in said object space; and carrying out a second measuring step using an enlarged divergence angle of said transmitted beam for determining a location of said reference marks as coordinates for use as a reference in each first measuring step, wherein for changing said divergence angle in said second measuring step at least one of said optical elements is movable in at least one of said paths of rays.

23. Process as claimed in claim 22, wherein for changing said divergence angle in said second measuring step at least one optical element is movable in said first path of rays.

24. Process as claimed in claim 22, wherein for changing said divergence angle in said second measuring step at least one optical element is movable in said second path of rays.

25. Process as claimed in claim 22, wherein for changing said divergence angle in said second measuring step at least one optical element is movable into and out of at least one of said path of rays.

26. Process as claimed in claim 22, wherein for changing said divergence angle in said second measuring step at least one optical element comprises:

means for changing a focus of the at least one optical element.

27. Process as claimed in claim 22, wherein said at least one optical element enlarges said divergence angle.

28. Process as claimed in claim 22, wherein said divergence angle is changed at least by a factor of 10.

29. Process as claimed in claim 22, wherein said divergence angle is changed by a factor of 20 in maximum.

30. Process as claimed in claim 22, wherein said at least one optical element comprises at least one lens.

31. Process as claimed in claim 1, wherein said enlarged divergence angle corresponds at least to said angle of deflection between two subsequent measuring cycles in said scanning step.

32. An apparatus for measuring an object space using an opto-electronic range finder which operates according to a method of determining a time-of-flight of a signal, in combination with reference marks located in said object space, said apparatus comprising;
   transmitter means for transmitting optical transmitter pulse signals as a beam of a predetermined first divergence angle along a first path of rays into an object space, said transmitter means including first optical means including at least one optical element within said path of rays of said optical transmitter signals, said optical means defining a first optical axis;
   receiver means for receiving optical pulse signals reflected from an object situated in said object space after a time-of flight of said transmitter pulse signals, said reflected pulse signals having a time relationship during a measuring cycle between a transmitted and a reflected pulse signal, said receiver means including second optical means having at least one optical element and defining a second optical axis in a second path of rays for receiving said reflected pulse signals from a second divergence angle;
   evaluating means for evaluating and determining a distance value from at least one of said time-of-flight and said time relationship;
   scanning means for scanning said object space by deviating a direction of said first and second optical axes by an angle of deflection between two subsequent measuring cycles in two different directions, said angle being adjustable;
   decoding means for determining an actual angle of deviation during scanning; and
   means for changing at least said first divergence angle to determine a location of said reference marks using an enlarged angle of deviation in one mode of operation, while scanning said object space with a reduced angle of deviation in another mode of operation.

33. Apparatus as claimed in claim 32, wherein said transmitter means comprise:
   a laser.

34. Apparatus as claimed in claim 32, wherein said scanning means are constructed to scan and deviate said beams in two directions substantially orthogonal to each other.

35. Apparatus as claimed in claim 32, comprising:
   means for reducing power of at least one of said transmitter signals and said signals of said receiving means.

36. Apparatus as claimed in claim 35, wherein said power reducing means comprise:
   an optical damping element arranged in at least one of said paths of rays to exert an optical damping effect.

37. Apparatus as claimed in claim 36, wherein said optical damping element comprises:
   gray filter means.

38. Apparatus as claimed in claim 37, wherein said gray filter means comprises:
   gray wedge displaceable into at least two positions of different damping effect, and displacing means for moving said gray wedge from one of said two positions into another one.

39. Apparatus as claimed in claim 36, wherein said optical damping element comprises:
   at least one adjustable aperture diaphragm.

40. Apparatus as claimed in claim 39, wherein said diaphragm is an apertured diaphragm having at least two apertures of different size.

41. Apparatus as claimed in claim 36, wherein said damping element is of the type whose damping effect is continuously changeable.

42. Apparatus as claimed in claim 36, wherein said damping element is of the type whose damping effect is changeable in steps.

43. Apparatus as claimed in claim 32, wherein for changing said first divergence angle, at least one of said optical elements is movable in at least one of said paths of rays.

44. Apparatus as claimed in claim 43, wherein said at least one optical element is movable into and out of at least one of said path of rays.

45. Apparatus as claimed in claim 43, wherein said at least one optical element comprises means for changing its focus.

46. Apparatus as claimed in claim 43, wherein said at least one optical element comprises:
   means for changing its focus.

47. Apparatus as claimed in claim 46, wherein said divergence angle enlarging optical element is dimensioned to enlarge said divergence angle by a factor of at least 10.

48. Apparatus as claimed in claim 46, wherein said divergence angle enlarging optical element is dimensioned to enlarge said divergence angle by a factor of 20 in maximum.

49. Apparatus as claimed in claim 43, wherein said at least one optical element comprises at least one moveable lens.

50. Process as claimed in claim 1, wherein said first and second paths of rays are substantially parallel to each other.

51. Process as claimed in claim 5, wherein said first and second paths of rays are substantially parallel to each other.

52. Process as claimed in claim 16, wherein said first and second paths of rays are substantially parallel to each other.

53. Process as claimed in claim 22, wherein said first and second paths of rays are substantially parallel to each other.

54. Process as claimed in claim 5, comprising:
   forming a 3-D image of said object space by measuring said object space from at least two different directions, and
   using said coordinates of said retro-reflectors to form said 3-D image.

55. A process for measuring an object space using an opto-electronic range finder for determining the time-of-flight of a signal, said process comprising:
   a first measuring step for:
   transmitting optical transmitter signals as a beam of a predetermined first divergence angle along a first path of rays into said object space;
   receiving optical signals reflected from an object situated in said object space by receiver means after a time-of flight of said transmitter signals, said reflected signals having a certain time relationship during a measuring cycle between a transmitted and a reflected signal;
   providing first optical means within said path of rays of said optical transmitter signals, said optical means defining a first optical axis, and second optical means arranged before said receiver means and defining a second optical axis in a second path of rays;
   scanning said object space by deviating the direction of said first and second optical axes by a certain angle of deflection between two subsequent measuring cycles, said angle being adjustable; and decoding said angle for determining the actual angle of deviation during scanning;

evaluating and determining a distance value from at least one of said time-of-flight and said time relationship;

arranging reference marks in said object space; and carrying out a second measuring step using an enlarged divergence angle of said transmitted beam for determining the location of said reference marks as coordinates for use as a reference in each first measuring step so that in said first measuring step corresponding measuring spots are spaced from one another, while in said second measuring step the divergence angle is widened as compared with said first measuring step.

56. A process for measuring an object space using an opto-electronic range finder for determining the time-of-flight of a signal, said process comprising:

a first measuring step for:

transmitting optical transmitter signals as a beam of a predetermined first divergence angle along a first path of rays into said object space;

receiving optical signals reflected from an object situated in said object space by receiver means after a time-of flight of said transmitter signals, said reflected signals having a certain time relationship during a measuring cycle between a transmitted and a reflected signal;

providing first optical means within said path of rays of said optical transmitter signals, said optical means defining a first optical axis, and second optical means arranged before said receiver means and defining a second optical axis in a second path of rays;

scanning said object space by deviating the direction of said first and second optical axes by a certain angle of deflection between two subsequent measuring cycles, said angle being adjustable; and decoding said angle for determining the actual angle of deviation during scanning;

evaluating and determining a distance value from at least one of said time-of-flight and said time relationship;

arranging reference marks in said object space; and carrying out a second measuring step using an enlarged divergence angle of said transmitted beam for determining the location of said reference marks as coordinates for use as a reference in each first measuring step, wherein said enlarged divergence angle corresponds at least to said angle of deflection between two subsequent measuring cycles in said scanning step.

57. A process for measuring an object space using an opto-electronic range finder for determining the time-of-flight of a signal, said process comprising:

a first measuring step for:

transmitting optical transmitter pulse signals as a pulsed beam of a predetermined first divergence angle along a first path of rays into said object space;

receiving optical signals reflected from an object situated in said object space by receiver means after a time-of flight of said transmitter pulse signals, said reflected pulse signals having certain time relationship during a measuring cycle between a transmitted and a reflected pulse signal;

providing first optical means within said path of rays of said optical transmitter signals, said optical means defining a first optical axis, and second optical means arranged before said receiver means and defining a second optical axis in a second path of rays;

scanning said object space by deviating the direction of said first and second optical axes by a certain angle of deflection between two subsequent measuring cycles, said angle being adjustable; and decoding said angle for determining the actual angle of deviation during scanning;

evaluating and determining a distance value from at least one of said time-of-flight and said time relationship;

arranging reference marks in said object space; and carrying out a second measuring step using an enlarged divergence angle of said transmitted beam for determining a location of said reference marks as coordinates for use as a reference in each first measuring step.

58. A process for measuring an object space using an opto-electronic range finder for determining the time-of-flight of a signal, said process comprising:

a first measuring step for:

transmitting optical transmitter signals as a beam of a predetermined first divergence angle along a first path of rays into said object space;

receiving optical signals reflected from an object situated in said object space by receiver means after a time-of flight of said transmitter signals, said reflected signals having a certain time relationship during a measuring cycle between a transmitted and a reflected signal;

providing first optical means within said path of rays of said optical transmitter signals, said optical means defining a first optical axis, and second optical means arranged before said receiver means and defining a second optical axis in a second path of rays;

scanning said object space by deviating the direction of said first and second optical axes by a certain predetermined angle of deflection between two subsequent measuring cycles so as to obtain measuring spots in a predetermined distance from one another; and decoding said angle for determining the actual angle of deviation during scanning;

evaluating and determining a distance value from at least one of said time-of-flight and said time relationship;

arranging reference marks in said object space; and carrying out a second measuring step using an enlarged divergence angle of said transmitted beam for determining the location of said reference marks as coordinates for use as a reference in each first measuring step.

59. Process as claimed in claim 58, wherein said predetermined angle is adjustable.

60. Process as claimed in claim 58, wherein said step of scanning is effected in two different directions.

61. Process as claimed in claim 60, wherein said directions are orthogonal to each other.

62. Process as claimed in claim 60, wherein said step of scanning is effected with said certain angle of deflection so as to achieve a regular distribution of measuring signals.

63. A process for measuring an object space using an opto-electronic range finder for determining the time-of-flight of a signal, said process comprising:

a first measuring step for:

transmitting optical transmitter signals as a beam of a predetermined first divergence angle along a first path of rays into said object space;

receiving optical signals reflected from an object situated in said object space by receiver means after a time-of flight of said transmitter signals, said reflected signals having a certain time relationship during a measuring cycle between a transmitted and a reflected signal;

providing first optical means within said path of rays of said optical transmitter signals, said optical means defining a first optical axis, and second optical means arranged before said receiver means and defining a second optical axis in a second path of rays;

scanning said object space by deviating the direction of said first and second optical axes by a certain angle of deflection between two subsequent measuring cycles, said angle being adjustable; and decoding said angle for determining the actual angle of deviation during scanning;

evaluating and determining a distance value from at least one of said time-of-flight and said time relationship;

arranging reference marks in said object space; and carrying out a second measuring step using an enlarged divergence angle of said transmitted beam for determining the location of said reference marks as coordinates for use as a reference in each first measuring step, the factor of enlargement of said divergence angle amounting at least to 5.

64. Process as claimed in claim 63, wherein said factor of enlargement of said divergence angle amounts at least to 10.

65. Process as claimed in claim 63, wherein said factor of enlargement of said divergence angle amounts to 20 in maximum.

66. A process for measuring an object space using an opto-electronic range finder which operates according to a method of determining the time-of-flight of a signal, said process comprising:

a first measuring step for:

transmitting optical transmitter signals as a beam of a predetermined first divergence angle along a first path of rays into said object space;

receiving optical signals reflected from an object situated in said object space by receiver means after a time-of flight of said transmitter signals, said reflected signals having a certain time relationship during a measuring cycle between a transmitted and a reflected signal;

providing first optical means within said path of rays of said optical transmitter signals, said optical means defining a first optical axis, and second optical means arranged before said receiver means and defining a second optical axis in a second path of rays;

scanning said object space by deviating the direction of said first and second optical axes by a certain predetermined angle of deflection between two subsequent measuring cycles, said angle being adjustable; and decoding said angle for determining the actual angle of deviation during scanning;

evaluating and determining a distance value from at least one of said time-of-flight and said time relationship;

arranging reference marks in said object space;

carrying out first and second measuring steps using a reduced divergence angle of said transmitted beam in one of said steps, and an enlarged divergence angle of said transmitted beam in another one of said steps, thus determining in said measuring step using an enlarged divergence angle an object field in which said reference marks are located; and carrying out a third measuring step using said reduced divergence angle, while scanning only said object field with a smaller angle of deflection between two subsequent measuring cycles to reduce the scanning rate within said object field for determining the location of said reference marks as coordinates for use as a reference in each first measuring step.

67. Process as claimed in claim 66, wherein at least one of said scanning rate and said angle of deviation is chosen so that the measuring spots overlap each other.

* * * * *